US012759504B2

(12) United States Patent
Kominar et al.

(10) Patent No.: US 12,759,504 B2
(45) Date of Patent: Oct. 13, 2026

(54) CONTEXT-AWARE VEHICLE LOCKDOWN THEFT DETERRENCE SYSTEM AND METHOD

(71) Applicant: BlackBerry Limited, Waterloo (CA)

(72) Inventors: Jeremy Lawson Kominar, Waterloo (CA); Neil Patrick Adams, Waterloo (CA)

(73) Assignee: BlackBerry Limited, Waterloo (CA)

( * ) Notice: Subject to any disclaimer, the term of this patent is extended or adjusted under 35 U.S.C. 154(b) by 0 days.

(21) Appl. No.: 19/091,469

(22) Filed: Mar. 26, 2025

(65) Prior Publication Data

US 2026/0296367 A1 Oct. 1, 2026

(51) Int. Cl.

*B60R 25/24* (2013.01)
*B60R 25/01* (2013.01)
*B60R 25/31* (2013.01)
*G07C 9/00* (2020.01)

(52) U.S. Cl.

CPC .............. *B60R 25/24* (2013.01); *B60R 25/01* (2013.01); *B60R 25/31* (2013.01); *G07C 9/00309* (2013.01); *G07C 2009/00793* (2013.01); *G07C 2209/63* (2013.01)

(58) Field of Classification Search

CPC ......... B60R 25/24; B60R 25/01; B60R 25/31; G07C 9/00309; G07C 2009/00793; G07C 2209/63

See application file for complete search history.

(56) References Cited

U.S. PATENT DOCUMENTS

| | | | |
|---|---|---|---|
| 5,783,994 | A | 7/1998 | Koopman, Jr. et al. |
| 9,902,368 | B2 | 2/2018 | Maiwand et al. |
| 11,014,536 | B2 | 5/2021 | Krishnan et al. |
| 12,365,311 | B2 | 7/2025 | Muto |
| 2013/0271273 | A1 | 10/2013 | Oesterling |

(Continued)

FOREIGN PATENT DOCUMENTS

| | | |
|---|---|---|
| CN | 118770123 A | 10/2024 |
| EP | 3720741 | 10/2020 |

OTHER PUBLICATIONS

International Search Report & Written Opinion of the International Searching Authority; PCT/CA2026/050450; Jun. 4, 2026; 7 pages.

*Primary Examiner* — Omeed Alizada

(74) *Attorney, Agent, or Firm* — Conley Rose, P.C.; J. Robert Brown, Jr.

(57) ABSTRACT

A vehicle entry control unit. The vehicle entry control unit comprises a processor; a non-transitory memory comprising a first set of vehicle unlock rules, wherein the first set of vehicle unlock rules are user-defined vehicle unlock rules; and an application stored in the non-transitory memory, that, when executed by the processor determines at a first time a first context of a vehicle in which the vehicle entry control unit is installed, identifies a first rule in the first set of vehicle unlock rules associated with the first context, unlocks the vehicle based on the first rule in the first set of vehicle unlock rules, determines at a second time a second context of the vehicle, identifies a second rule in the first set of vehicle unlock rules associated with the second context, and unlocks the vehicle based on the second rule in the first set of vehicle unlock rules.

20 Claims, 5 Drawing Sheets

(56) References Cited

U.S. PATENT DOCUMENTS

| | | | | |
|---|---|---|---|---|
| 2015/0102898 | A1* | 4/2015 | Huennekens | B60R 25/24 340/5.6 |
| 2018/0072271 | A1 | 3/2018 | Yiwei et al. | |
| 2018/0247483 | A1 | 8/2018 | Lindsay | |
| 2019/0143936 | A1* | 5/2019 | Abel Rayan | H04W 12/68 701/2 |
| 2020/0071967 | A1 | 3/2020 | Adams et al. | |

* cited by examiner

CONTEXT-AWARE VEHICLE LOCKDOWN THEFT DETERRENCE SYSTEM AND METHOD

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Motor vehicles may have locking mechanisms for doors to deter unauthorized entry into the vehicles. In the past, only mechanical keys were used to open locks from the outside of vehicles. In recent years, various electronic and/or electric vehicle unlock mechanisms have been deployed. These systems may involve an electro-mechanical door lock that can be operated mechanically or electronically. The electro-mechanical door lock can be locked by manually closing a door lock from inside the vehicle, by activating a door lock switch inside the car, or by sending a door lock command signal from a wireless vehicle fob. The electro-mechanical door lock may be unlocked by sending a door unlock command signal from the wireless vehicle fob, by actuating switches or pushbuttons disposed on the outside of a vehicle door, or by turning a physical key in a key receptacle in the vehicle door.

SUMMARY

In an embodiment, a vehicle entry control unit is disclosed. The vehicle entry control unit comprises a processor; a non-transitory memory comprising a first set of vehicle unlock rules, wherein the first set of vehicle unlock rules are user-defined vehicle unlock rules; and an application stored in the non-transitory memory. When executed by the processor, the application determines at a first time a first context of a vehicle in which the vehicle entry control unit is installed, identifies a first rule in the first set of vehicle unlock rules associated with the first context, in response to receiving a first wireless remote unlock signal, unlocks the vehicle based on the first rule in the first set of vehicle unlock rules, determines at a second time a second context of the vehicle, identifies a second rule in the first set of vehicle unlock rules associated with the second context, and, in response to receiving a second wireless remote unlock signal, interdicts the vehicle entry control unit unlocking the vehicle based on the second rule in the first set of vehicle unlock rules.

In another embodiment, a method of controlling entry to a vehicle is disclosed. The method comprises determining a first context of the vehicle at a first time by a vehicle entry control unit; receiving a first wireless remote unlock signal by the vehicle entry control unit; and, in response to receiving the first wireless remote unlock signal, looking up a first user-defined vehicle unlock rule by the vehicle entry control unit based on the first context. The method further comprises, based on the first user-defined vehicle unlock rule, interdicting electro-mechanical unlock of the vehicle by the vehicle entry control unit; determining a second context of the vehicle at a second time by the vehicle entry control unit; receiving a second wireless remote unlock signal by the vehicle entry control unit; in response to receiving the second wireless remote unlock signal, looking up a second user-defined vehicle unlock rule by the vehicle entry control unit based on the second context; and, based on the second user-defined vehicle unlock rule and the second wireless remote unlock signal, commanding electro-mechanical unlock of the vehicle by the vehicle entry control unit.

In yet another embodiment, a method of controlling entry to a vehicle is disclosed. The method comprises receiving a first wireless remote unlock signal at a first time by a vehicle entry control unit; determining a first context of the vehicle by the vehicle entry control unit after the first time, wherein the first context is a high security risk context; in response to determining the first context of the vehicle, determining by the vehicle entry control unit within a pre-defined time interval after the first time that a plurality of door handles of the vehicle are being actuated; and, based on receiving the first wireless remote unlock signal and based on determining that a plurality of door handles of the vehicle are being actuated, commanding electro-mechanical unlock of the vehicle by the vehicle entry control unit.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
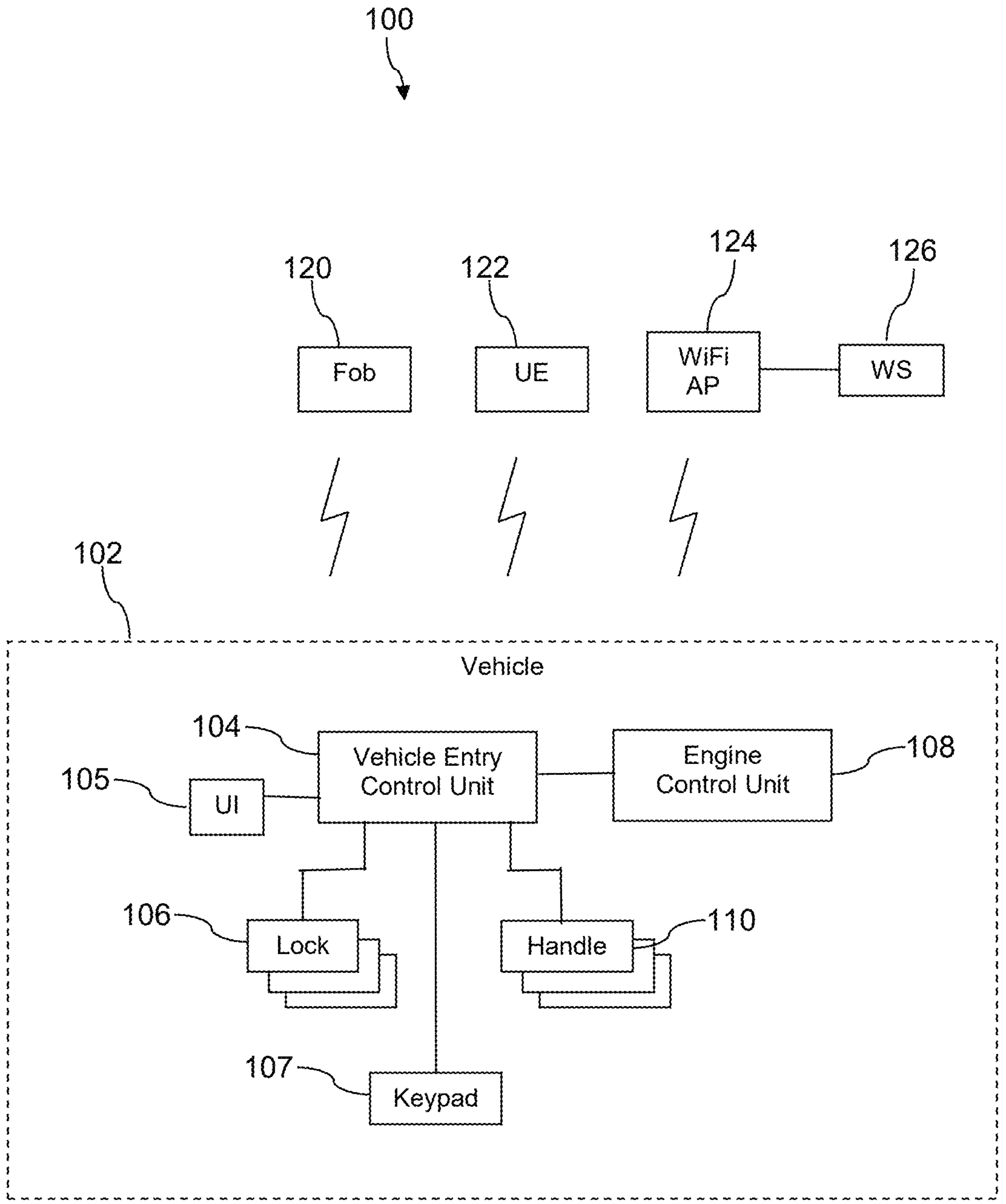
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure teaches a vehicle entry control unit that provides rules-based vehicle unlocking in response to receiving a wireless remote unlock command or signal. Vehicle unlock rules can be programmed differently in different vehicles, such that more restrictive vehicle unlock rules can be used by a first vehicle and less restrictive vehicle unlock rules can be used by a second vehicle that is the same make, model, and production year as the first vehicle. For example, a car owner who parks the first vehicle on a city street may prefer more restrictive vehicle unlock rules be configured into the vehicle entry control unit in the first vehicle, while a car owner who parks the second vehicle on a farm in a rural area or on the street in a small rural village may prefer less restrictive unlock rules be configured into the vehicle entry control unit in the second vehicle. Also, an individual may prefer less restrictive and more convenient vehicle unlock rules be configured into a third vehicle that the individual owns, while a car rental company may prefer more restrictive and less convenient vehicle unlock rules be configured into a fourth vehicle that is owned by the car rental company, where the third vehicle may be the same make, model, and production year as the fourth vehicle. In an embodiment, a car insurance company may offer different discounted rates to policy holders based on the car owners accepting different tradeoffs between vehicle unlock convenience versus unlocking security. As taught herein, vehicle unlock rules can be defined and installed into the vehicle entry control unit after the vehicle is delivered by an original equipment manufacturer (OEM) to a vehicle owner—e.g., a private individual or a vehicle fleet operator. In some contexts, vehicle unlock rules may be referred to as user defined vehicle unlock rules to distinguish them from default vehicle unlock rules that may be defined by an OEM of a vehicle and/or to distinguish them from statically defined vehicle unlock rules that apply to each different vehicle instance of a same make, model, and production year of a given vehicle.

In an embodiment, the vehicle entry control unit disclosed herein may apply context-based vehicle unlock rules. For example, the vehicle entry control unit may autonomously determine a context of the vehicle and apply different vehicle unlock rules when the vehicle is in different contexts. The context of the vehicle may be a time of day and a day of the week. The context of the vehicle can be a location of the vehicle—such as located in a residential garage, located in a driveway outside of a residential garage, located in a residential area but away from the residence of an owner of the vehicle, located at an office parking garage, located at a shopping area, located in a city. The context of the vehicle can be that a smart phone of the driver of the vehicle is sensed to be near at hand (e.g., through a WiFi radio signal interaction, through a BlueTooth radio signal interaction or via a near field communication (NFC) radio signal interaction).

The context of the vehicle can include how many door handles of the vehicle are being touched at the time a wireless remote unlock signal is received by the vehicle entry control unit. For example, if only a single door handle of the vehicle is being touched at the time that a wireless remote unlock signal is received by the vehicle entry control unit, the unlock function may be defeated, while if two door handles of the vehicle are being touched at the time that the wireless remote unlock signal is received by the vehicle entry control unit, the unlock function is enabled. The vehicle entry control unit may maintain a history of vehicle use such that it infers that two vehicle occupants exited the vehicle when it was last locked, that the vehicle was parked at an "away from home" location when it was last locked, and hence requires that two vehicle occupants be proximate to the vehicle when it next receives a wireless remote unlock signal to enable the unlock function. This unlocking rule may prevent car theft in some contexts.

The vehicle entry control unit can apply vehicle unlock rules from most permissive to most restrictive, depending on different vehicle contexts. The least restrictive vehicle unlock rule may be to allow any received wireless remote unlock signal to unlock the vehicle—unlock using an electronic fob, unlock using a radio transmission from an application on a user equipment (UE) (e.g., a mobile phone), or unlock using a radio transmission from a WiFi access point. The most restrictive vehicle unlock rule may be to defeat unlocking in response to all wireless remote unlock signals and to defeat the keypad entry code method and allow only the method of using a physical key to unlock the vehicle or using a NFC interaction between a key or fob with the door of the vehicle to unlock the vehicle. Intermediate levels of vehicle unlock restrictions may be to defeat some kinds of wireless remote unlock signals but allow some other method(s) of wireless remote unlock signals. For example, in one context based on one vehicle unlock rule, the vehicle entry control unit may unlock the vehicle in response to receiving a wireless remote unlock signal from a fob but not unlock the vehicle in response to receiving a wireless remote unlock signal from a smart phone or from a WiFi access point.

In an embodiment, the vehicle entry control unit may be configured with two or more different sets of vehicle unlock rules. For example, if a vehicle may be driven by different drivers, different vehicle unlock rules may be defined for each different driver. The different drivers may be identified by any feasible method. Different drivers may be distinguished by their different fobs. Different drivers may be distinguished by selecting a switch inside the vehicle. Different drivers may be distinguished by sensing their different weights and/or heights while sitting in the driver's seat of the vehicle.

In another circumstance, the vehicle entry control unit may be configured with two or more different sets of vehicle unlock rules that apply to all drivers. This may be the case if an insurance company imposes a first set of vehicle unlock rules and an owner of the vehicle defines a second set of vehicle unlock rules. In this case, the vehicle entry control unit may analyze both sets of vehicle unlock rules, select two different rules—each of which applies given the current vehicle context, and then apply the most restrictive unlocking rule.

Turning now to FIG. 1, a system 100 is described. In an embodiment, the system 100 comprises a motor vehicle 102 that comprises a vehicle entry control unit 104, a user interface 105, one or more electro-mechanical locks 106, an optional keypad 107, and an engine control unit 108. In an embodiment, the vehicle entry control unit 104 may be a separate electronic device in the vehicle 102. Alternatively, in an embodiment, the vehicle entry control unit 104 may be a function among other functions embedded within another electronic device in the vehicle 102, for example, the vehicle entry control unit 104 may be embedded in a telematics unit or an in-vehicle computer system within the vehicle 102. In an embodiment, the motor vehicle 102 may further comprise one or more door handle sensors 110. The motor vehicle 102 may be a passenger car, a pick-up truck, a sport utility vehicle (SUV), a mini-van, a van, a moving van, a delivery truck, or other motor vehicle.

The one or more electro-mechanical locks 106 may be unlocked mechanically, as for example by inserting a physical key into a key tumbler and turning the physical key and/or by operating a button mechanically coupled to the electro-mechanical locks 106. Alternatively, the electro-mechanical locks 106 may be unlocked electrically, as for example by sending an electric signal to a solenoid integrated into the electro-mechanical locks 106. The electro-mechanical locks 106 may be locked mechanically, as for example by physically moving a switch mechanically coupled to the electro-mechanical locks 106. The electro-mechanical locks 106 may be locked electrically, as for example by sending an electric signal to the solenoid integrated into the electro-mechanical locks 106. The vehicle entry control unit 104 is electrically coupled to the one or more electro-mechanical locks 106, whereby the vehicle entry control unit 106 can send an electric signal to the one or more electro-mechanical locks 106 to cause them to lock or to unlock. In an embodiment, a driver may enter an entry code into the keypad 107, the keypad 107 may send the entry code to the vehicle entry control unit 104, and the vehicle entry control unit 104, after validating the entry code, may send the electric signal to the one or more electro-mechanical locks 106 to cause them to unlock.

In an embodiment, the vehicle entry control unit 104 may issue a command to the engine control unit 108. For example, the vehicle entry control unit 104 may issue an engine start command to the engine control unit 108 in association with unlocking the electro-mechanical locks 106. Alternatively, the vehicle entry control unit 104 may issue the engine start command to the engine control unit 108 without unlocking the electro-mechanical locks 106, in response to receiving a wireless remote engine start command.

In an embodiment, the system 100 may compromise one of more of a vehicle fob 120, a user equipment (UE) 122, and/or a WiFi access point (AP) 124. The UE 122 may be a mobile phone, a smart phone, a personal digital assistant, a wearable computer, a headset computer, a laptop computer, a tablet computer, or a notebook computer. The fob 120, the UE 122, or the WiFi AP 124 may send a wireless remote unlock signal or command or a wireless remote lock signal or command to the vehicle entry control unit 104. The vehicle entry control unit 104 may or may not respond to receiving a wireless remote unlock/lock signal by commanding the electro-mechanical locks 106 to unlock or to lock. In an embodiment, the fob 120, the UE 122, and/or the WiFi AP 124 may send a wireless remote unlock signal that includes an authentication code that is analyzed by the vehicle entry control unit 104 to validate the code before responding by unlocking the electro-magnetic locks 106. If the authorization code is invalid, the vehicle entry control unit 104 may not command the electro-magnetic locks 106 to unlock. In an embodiment, the authentication code sent by the fob 120, the UE 122, and/or the WiFi AP 124 may be a rolling code, whereby to deter replay attacks to unlock the vehicle 102 by an unauthorized person (e.g., by a thief). In an embodiment, at least a portion of the wireless remote unlock signal transmitted by the fob 120, UE 122, and/or WiFI AP 124 may be encrypted.

Figure 2:
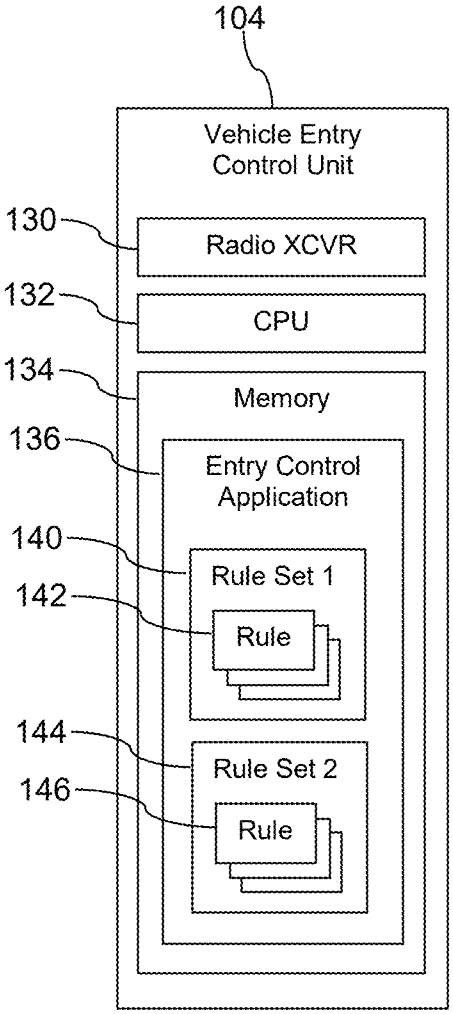
FIG. 2 is a block diagram of a vehicle entry control unit according to an embodiment of the disclosure.

Turning now to FIG. 2, further details of the vehicle entry control unit 104 are described. In an embodiment, the vehicle entry control unit 104 comprises one or more radio transceivers 130, a processor (CPU) 132, and a memory 134. The radio transceiver 130 may comprise a WiFi transceiver. The radio transceiver 130 may comprise a short-range radio transceiver. In an embodiment, a short-range radio transceiver may be restricted to communicating with another short-range radio at a maximum range of less than 100 feet, less than 200 feet, or less than 300 feet under ordinary circumstances. The radio transceiver 130 may comprise a near-field communication radio transceiver.

A non-transitory portion of the memory 134 may store a vehicle entry control application 136. In an embodiment, the vehicle entry control application 136 may be configured with a first rule set 140 comprising one or move vehicle unlock rules 142. In an embodiment, the vehicle entry control application 136 may be configured with a second rule set 144 comprising one or more vehicle unlock rules 146. In an embodiment, the vehicle entry control application 136 may be configured with more than two different rule sets of vehicle unlock rules and less than twenty different rule sets of vehicle unlock rules. The vehicle entry control unit 104 may receive electric power from an external power source, for example from a battery installed in the vehicle 102. When powered on, the processor 132 executes the entry control application 136.

With reference now to both FIG. 1 and FIG. 2, the vehicle entry control unit 104 and/or the entry control application 136 executing on the processor 132 may receive a wireless remote unlock signal or command from the fob 120, the UE 122, or the WiFi AP 124. For example, the radio transceiver 130 may receive a wireless remote unlock signal embedding a code from the fob 120, the UE 122, or the WiFi AP 124. If the code is deemed to be valid (e.g., is not the unlock code from the neighbor's fob opening the neighbor's car in the driveway adjacent to where the vehicle 102 is parked), the entry control application 136 evaluates whether the wireless remote unlock signal or command is allowed by a rule 142, 146 of either the first rule set 140 or the second rule set 144. If the unlock command is allowed, the entry control application 136 sends an unlock command to one or more of the electro-mechanical locks 106.

In an embodiment, part of the evaluation of rules 142, 146 is determining a context of the vehicle 102 by the entry control application 136. The context may be a time of day and day of week. For example, one of the rules 142 may indicate that a wireless remote unlock signal or command from any source between the hours of 11 pm and 5 am (hours when the owner of the vehicle may expect to be home in bed) is defeated or suppressed. Under this circumstance, the only remaining means to unlock the vehicle 102 is to insert a physical key into a key tumbler and mechanically unlock the vehicle 102 (i.e., to unlock the driver's side door lock) or to have the fob 120 successfully complete an NFC interaction with the vehicle entry control unit 104. In this case, if the vehicle entry control unit 104 wirelessly receives a wireless remote signal from the fob 120, the rule defeats or suppresses the wireless remote unlocking of the vehicle 102. This may prevent a criminal from stealing the code from the fob 120 and using the stolen code to unlock and steal the vehicle 102 in the wee hours of the morning. Under a different context, for example at 6:30 am, the vehicle entry control unit 104 may respond to receiving a wireless remote unlock signal from the fob 120 by unlocking the vehicle 102.

The entry control application 136 can autonomously determine a location of the vehicle 102 and perform a geofencing algorithm to determine if the vehicle 102 is in a pre-defined location context—for example in a "parked at home" location, in a "parked at work" location, in a "parked at the grocery store" location. The entry control application 136 can determine if the UE 122 is proximate to the vehicle 102, and the proximity of the UE 122 may be part of the context of the vehicle 102. For example, if a husband has parked the vehicle 102 at his work location, when he attempts to unlock the vehicle 102 it may be expected that his UE 122 be with him (e.g., proximate to the vehicle 102) when he attempts to unlock the vehicle 102 with a wireless command from the fob 120. In a context where the vehicle 102 is parked at his work location but his UE 122 is not proximate to the vehicle when the fob 120 sends a wireless remote unlock signal to the vehicle 102, the fob 120 may have been stolen or found on the floor of the parking garage. The entry control application 136 may detect the proximity of the UE 122 based on a WiFi radio signal transmitted by the UE 122, based on a BlueTooth radio signal transmitted by the UE 122, or based on a NFC radio signal transmitted by the UE 122.

The entry control application 136 may determine a location of the vehicle 102 via a global positioning system (GPS) receiver disposed in the vehicle 102, for example, disposed in a telematics unit and/or in-vehicle computer system. The entry control application 136 may determine a location of the vehicle 102 using cell site triangulation or trilateration techniques. In an embodiment, the UE 122 may determine a location of the UE 122; the UE 122 may wirelessly transmit its determined location to the vehicle entry control unit 104, and the entry control application 136 may use the location of the UE 122 as a proxy for the location of the vehicle 102.

The entry control application 136 can determine a context that includes how many handles 110 are being touched when the fob 120 or UE 122 sends a wireless remote unlock signal or command to the vehicle entry control unit 104. The entry control application 136 can execute a rule that indicates that when the vehicle 102 is away from a home residence, when the vehicle 102 is parked and locked, the number of passengers that exit the vehicle 102 is expected to match a number of handles 110 being touched when the fob 120 or UE 122 sends a wireless remote unlock signal or command to the vehicle entry control unit 104. If the number of handles 110 being touched does NOT match that number, the entry control application 136 defeats or suppresses wireless unlocking of the electro-mechanical locks 106. When the vehicle 102 is parked away from a location deemed to be a home or residence, the entry control application 136 may store contextual information at the time the vehicle 102 is locked. For example, the entry control application 136 can store a number of occupants who are in the vehicle as it is parked, based on input from sensors in seats in the vehicle 102, based on touch sensors throughout the interior of the vehicle 102, based on input from optical sensors in the interior of the vehicle 102, or based on other sensor inputs. A home location or residence may be determined by the entry control application 136 based on where the vehicle 102 is located overnight or based on where the vehicle 102 is most often parked (overnight, weekends, holidays, etc.). Alternatively, in an embodiment, the driver of the vehicle 102 may provide input to the vehicle entry control unit 104 via the UI 105, for example, via a touchscreen of a telematics unit or in-vehicle computer system. It is understood that in any circumstance where analysis of the vehicle context against the rules 142, 146 by the entry control application 136 results in defeating or suppressing wireless unlocking of the electro-mechanical locks 106, unlocking the vehicle 102 using a physical key is always an option. In some circumstances, unlocking the vehicle 102 through an NFC interaction between the fob 120 and a door of the vehicle 102 may be an option to unlock the vehicle 102.

In an embodiment, the user of the vehicle 102 may define the rules 142, 146 using a companion application installed on the UE 122 and/or using a workstation 126 that is communicatively coupled to the WiFi AP 124. The user can define different contexts using a graphical user interface (GUI) or rule builder wizard presented in a display of the UE 122 and/or a display of the workstation 126. The user can associate different unlocking methods that are to be defeated or suppressed in the given context. It is understood that when a current context of the vehicle 102 does not match any pre-defined context in the rules 142, 146, the entry control application 136 may respond to and allow unlocking the vehicle 102 in response to any valid wireless remote unlock signal or command sent by the fob 120, the UE 122, or WiFi AP 124. Thus, the function of the context-based rules 142, 146 is negative—they define what wireless remote unlock signals are defeated or suppressed in the given context. In an embodiment, the UI 105 may provide a GUI or rule builder wizard for a driver of the vehicle 102 to define and create new rules 142, 146. In an embodiment, the second rule set 144 may be defined in an application executing on the workstation 126 and downloaded to the entry control application 136 via the WiFi AP 124 and the radio transceiver 130.

Figure 3:
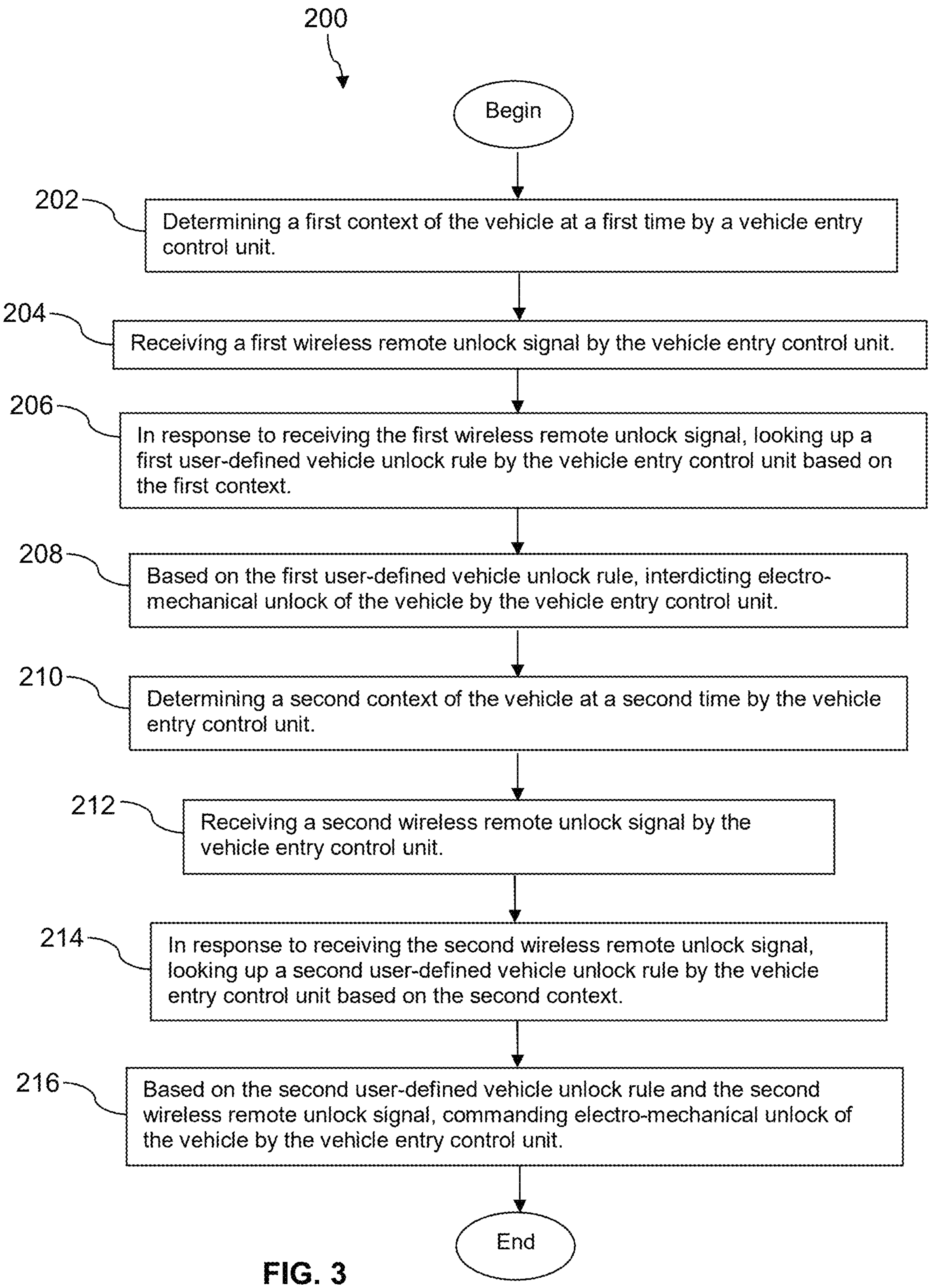
FIG. 3 is a flow chart of a method according to an embodiment of the disclosure.

Turning now to FIG. 3, a method 200 is described. In an embodiment, the method 200 is a method of controlling entry to a vehicle. At block 202, the method 200 comprises determining a first context of the vehicle at a first time by a vehicle entry control unit. In an embodiment, the first context is associated with a location of the vehicle entry control unit and wherein determining the first context of the vehicle comprises determining a location of the vehicle entry control unit at the first time. The location of the vehicle entry control unit may be considered to be a proxy for the location of the vehicle. The location of the vehicle entry control unit may be determined by a GPS received that is part of the vehicle entry control unit. The location of the vehicle entry control unit may be determined by a GPS disposed in another device within the vehicle, for example in a telematics or in-vehicle computer system. The location of the vehicle entry control unit may be determined by a UE associated with the driver of the vehicle, and the UE may send the location to the vehicle entry control unit. The location of the vehicle entry control unit may be determined by triangulation techniques based on received signal strengths of cell sites.

At block 204, the method 200 comprises receiving a first wireless remote unlock signal by the vehicle entry control unit. At block 206, the method 200 comprises, in response to receiving the first wireless remote unlock signal, looking up a first user-defined vehicle unlock rule by the vehicle entry control unit based on the first context.

At block 208, the method 200 comprises, based on the first user-defined vehicle unlock rule, interdicting electro-mechanical unlock of the vehicle by the vehicle entry control unit. At block 210, the method 200 comprises determining a second context of the vehicle at a second time by the vehicle entry control unit. In an embodiment, the second context is associated with a presence of a user equipment (UE) associated with a user of the vehicle and wherein determining the second context of the vehicle comprises sensing a presence of the UE.

At block 212, the method 200 comprises receiving a second wireless remote unlock signal by the vehicle entry control unit. At block 214, the method 200 comprises, in response to receiving the second wireless remote unlock signal, looking up a second user-defined vehicle unlock rule by the vehicle entry control unit based on the second context. At block 216, the method 200 comprises, based on the second user-defined vehicle unlock rule and the second wireless remote unlock signal, commanding electro-mechanical unlock of the vehicle by the vehicle entry control unit. In an embodiment, the first wireless remote unlock signal and the second wireless remote unlock signal both contain valid unlock codes.

In an embodiment, the first wireless remote unlock signal is received from a fob, from a user equipment, or from a WiFi access point (AP). In an embodiment, the first wireless remote unlock signal and the second wireless remote unlock signal are received from the same fob, user equipment, or WiFi AP.

Figure 4:
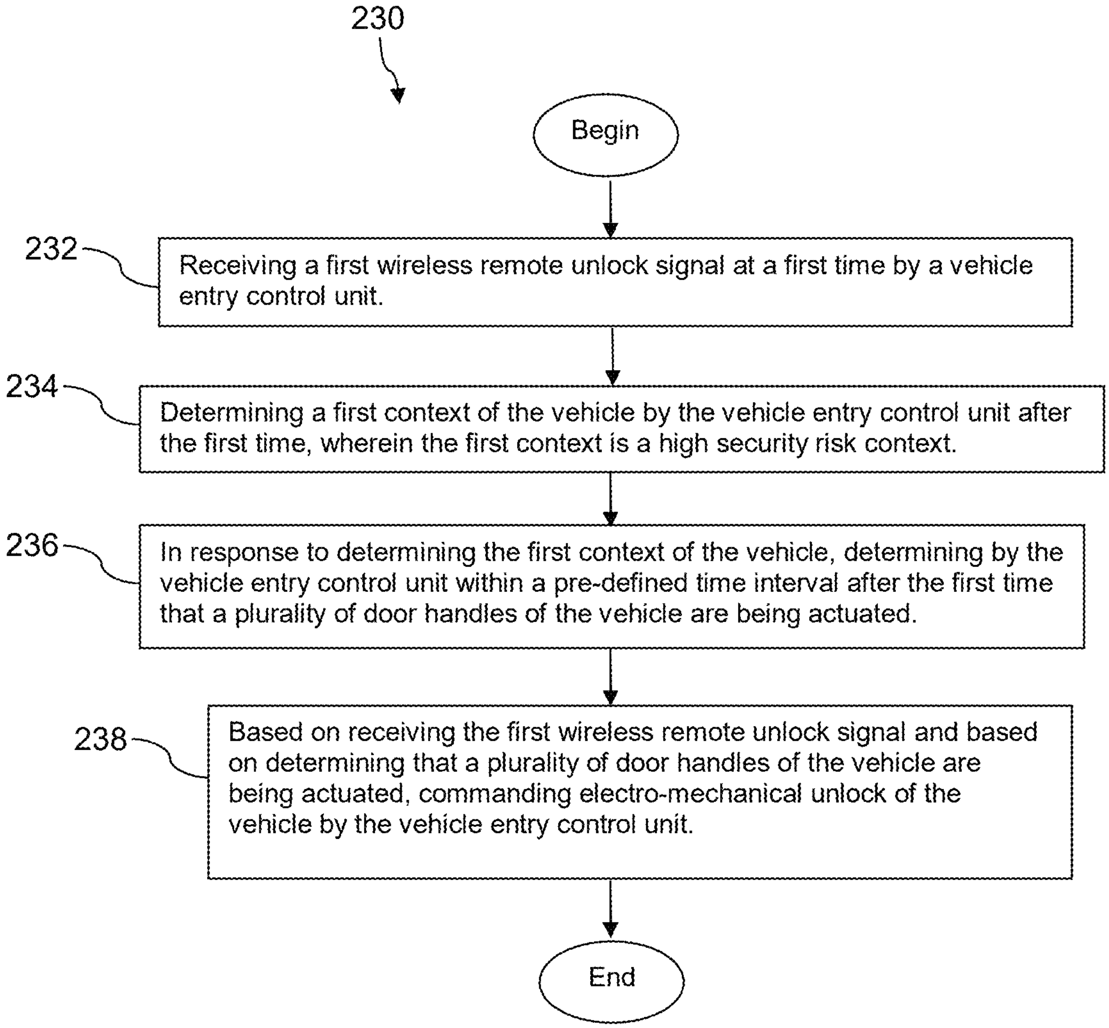
FIG. 4 is a flow chart of another method according to an embodiment of the disclosure.

Turning now to FIG. 4 a method 230 is described. In an embodiment, the method 230 is a method of controlling entry to a vehicle. In an embodiment, the vehicle is one of a passenger car, a pick-up truck, a sport utility vehicle (SUV), a mini-van, a van, a moving van, or a delivery truck. At block 232, the method 230 comprises receiving a first wireless remote unlock signal at a first time by a vehicle entry control unit. At block 234, the method 230 comprises determining a first context of the vehicle by the vehicle entry control unit after the first time, wherein the first context is a high security risk context. In an embodiment, determining the first context comprises comparing a location of the vehicle entry control unit to a definition of a high security risk area and determining that the vehicle entry control unit is located within the high security risk area. In an embodiment, the vehicle entry control unit stores a definition of a plurality of high security risk areas, wherein each high security risk area is delimited by a zip-code value or by a geohash value. A high security risk area may be an area identified by law enforcement and/or insurance carriers as having an above normal rate of crime, for example an above normal rate of car theft and/or an above normal rate of assault.

At block 236, the method 230 comprises, in response to determining the first context of the vehicle, determining by the vehicle entry control unit within a pre-defined time interval after the first time that a plurality of door handles of the vehicle are being actuated. At block 238, the method 230 comprises, based on receiving the first wireless remote unlock signal and based on determining that a plurality of door handles of the vehicle are being actuated, commanding electro-mechanical unlock of the vehicle by the vehicle entry control unit. In an embodiment, the method 230 further comprises sensing a number of occupants in the vehicle at a second time, where the second time is prior to the first time; storing the number of occupants in the vehicle by the vehicle entry control unit prior to the first time; and comparing the stored number of occupants in the vehicle to a number of the door handles that are being actuated by the vehicle entry control unit.

In an embodiment, the method 230 further comprises sensing a number of occupants in the vehicle at a third time, wherein the number of occupants of the vehicle is greater than one; storing the number of occupants in the vehicle by the vehicle entry control unit; receiving a second wireless remote unlock signal at a fourth time by the vehicle entry control unit, wherein the fourth time is after the third time; determining a second context of the vehicle by the vehicle entry control unit after the fourth time, wherein the second context is a high security risk context; in response to determining the second context of the vehicle, determining by the vehicle entry control unit within a pre-defined time interval after the fourth time that a single door handle of the vehicle is being actuated; comparing the stored number of occupants in the vehicle to the single door handle that is being actuated by the vehicle entry control unit; and based on receiving the second wireless remote unlock signal and based on determining that a single door handle of the vehicle is being actuated is less than the stored number of occupants, interdicting electro-mechanical unlock of the vehicle by the vehicle entry control unit.

Figure 5:
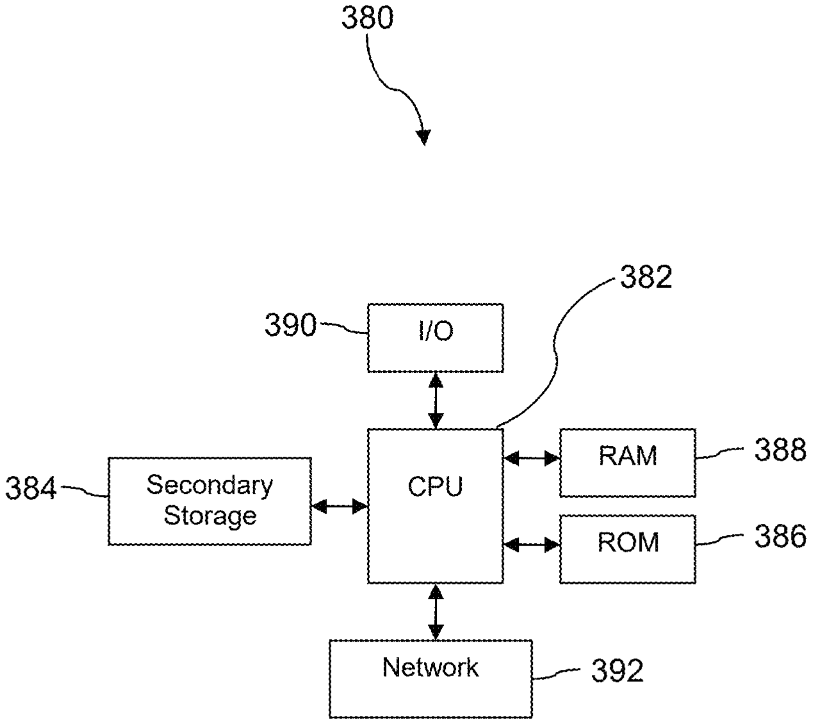
FIG. 5 is a block diagram of a computer system according to an embodiment of the disclosure.

FIG. 5 illustrates a computer system 380 suitable for implementing one or more embodiments disclosed herein. For example, the vehicle entry control unit 104, the UE 122, and/or the workstation 126 may be implemented in a form similar to that of the computer system 380. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards, and/or other well-known network devices. The network connectivity devices 392 may provide wired communication links and/or wireless communication links (e.g., a first network connectivity device 392 may provide a wired communication link and a second network connectivity device 392 may provide a wireless communication link). Wired communication links may be provided in accordance with Ethernet (IEEE 802.3), Internet protocol (IP), time division multiplex (TDM), data over cable service interface specification (DOCSIS), wavelength division multiplexing (WDM), and/or the like. In an embodiment, the radio transceiver cards may provide wireless communication links using protocols such as code division multiple access (CDMA), global system for mobile communications (GSM), long-term evolution (LTE), WiFi (IEEE 802.11), Bluetooth, Zigbee, narrowband Internet of things (NB IoT), near field communications (NFC), radio frequency identity (RFID). The radio transceiver cards may promote radio communications using 5G, 5G New Radio, or 5G LTE radio communication protocols. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk-based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third-party provider. Some cloud computing environments may comprise cloud computing resources owned and operated by the enterprise as well as cloud computing resources hired and/or leased from a third-party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid-state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A vehicle entry control unit, comprising: a processor; a non-transitory memory comprising a first set of vehicle unlock rules and a second set of vehicle unlock rules, wherein the first set of vehicle unlock rules are user-defined vehicle unlock rules; and an application stored in the non-transitory memory, that, when executed by the processor:

determines at a first time a first context of a vehicle in which the vehicle entry control unit is installed, identifies a first rule in the first set of vehicle unlock rules associated with the first context, identifies a second rule in the second set of vehicle unlock rules associated with the first context, selects, based on a comparison of the first rule and the second rule, a more restrictive first applicable rule associated with the first context, in response to receiving a first wireless remote unlock signal, unlocks the vehicle based on the more restrictive first applicable rule, determines at a second time a second context of the vehicle, identifies a third rule in the first set of vehicle unlock rules associated with the second context, identifies a fourth rule in the second set of vehicle unlock rules associated with the second context, selects, based on a comparison of the third rule and the fourth rule, a more restrictive second applicable rule associated with the second context, and in response to receiving a second wireless remote unlock signal, interdicts the vehicle entry control unit unlocking the vehicle based on the restrictive second applicable rule.

2. The vehicle entry control unit of claim 1, wherein the first context is associated with a location of the vehicle entry control unit and wherein determining the first context comprises determining the location of the vehicle entry control unit.

3. The vehicle entry control unit of claim 1, wherein the application further stores information about a number of persons who occupy the vehicle in which the vehicle entry control unit is installed prior to the persons vacating the vehicle and the vehicle locking, wherein determining the first context comprises determining a number of door handles of the vehicle being touched at the same time is equal to a number of the persons who occupied the vehicle when the vehicle was locked.

4. The vehicle entry control unit of claim 1, wherein the vehicle entry control unit comprises a radio transceiver and the radio transceiver receives the first wireless remote unlock signal.

5. The vehicle entry control unit of claim 4, wherein the first wireless remote unlock signal is received by the radio transceiver from a fob, from a user equipment (UE), or from a WiFi access point (AP).

6. The vehicle entry control unit of claim 4, wherein the application further determines at a third time a third context of the vehicle, wherein the third context is a range of time; receives a third wireless remote unlock signal; identifies a fifth rule in the first set of vehicle unlock rules associated with the third context; identifies a sixth rule in the second set of vehicle unlock rules associated with the third context; Selects, based on a comparison of the fifth rule and the sixth rule, a more restrictive third applicable rule associated with the third context; and interdicts the vehicle entry control unit unlock the vehicle based on the more restrictive third applicable rule.

7. The vehicle entry control unit of claim 1, wherein the application detects a presence of a predefined user equipment (UE) and the first context comprises the presence of the predefined UE.

8. The vehicle entry control unit of claim 1, wherein the first set of vehicle unlock rules is defined by an owner of the vehicle or a vehicle fleet operator, and wherein the second set of vehicle unlock rules is imposed by a vehicle insurer or a vehicle rental company.

9. A method of controlling entry to a vehicle, comprising:

determining a first context of the vehicle at a first time by a vehicle entry control unit;

receiving a first wireless remote unlock signal by the vehicle entry control unit;

in response to receiving the first wireless remote unlock signal, looking up a first rule in a first set of vehicle unlock rules by the vehicle entry control unit based on the first context, wherein the first set of vehicle unlock rules are user-defined vehicle unlock rules;

looking up a second rule in a second set of vehicle unlock rules by the vehicle entry control unit based on the first context;

selectin, based on a comparison of the first rule and the second rule, a more restrictive first applicable rule associated with the first context;

based on the more restrictive first applicable rule, interdicting electro-mechanical unlock of the vehicle by the vehicle entry control unit;

determining a second context of the vehicle at a second time by the vehicle entry control unit;

receiving a second wireless remote unlock signal by the vehicle entry control unit;

in response to receiving the second wireless remote unlock signal, looking up a third rule in the first set of vehicle unlock rules by the vehicle entry control unit based on the second context;

looking up a fourth rule in the second set of vehicle unlock rules by the vehicle entry control unit based on the second context;

selecting, based on a comparison of the third rule and the fourth rule, a more restrictive second applicable rule associated with the second context; and based on the more restrictive second applicable rule permitting electro-mechanical unlock of the vehicle in the second context and the second wireless remote unlock signal, commanding electro-mechanical unlock of the vehicle by the vehicle entry control unit.

10. The method of claim 9, wherein the first wireless remote unlock signal and the second wireless remote unlock signal both contain valid unlock codes.

11. The method of claim 9, wherein the first wireless remote unlock signal is received from a fob, from a user equipment, or from a WiFi access point (AP).

12. The method of claim 11, wherein the first wireless remote unlock signal and the second wireless remote unlock signal are received from the same fob, user equipment, or WiFi AP.

13. The method of claim 9, wherein the first context is associated with a location of the vehicle entry control unit and wherein determining the first context of the vehicle comprises determining a location of the vehicle entry control unit at the first time.

14. The method of claim 9, wherein the second context is associated with a presence of a user equipment (UE) associated with a user of the vehicle and wherein determining the second context of the vehicle comprises sensing a presence of the UE.

15. A method of controlling entry to a vehicle, comprising:

receiving a first wireless remote unlock signal at a first time by a vehicle entry control unit;

determining a first context of the vehicle by the vehicle entry control unit after the first time, wherein the first context is a high security risk context;

identifying a first rule in a first set of vehicle unlock rules by the vehicle entry control unit based on the first context, wherein the first set of vehicle unlock rules are user-defined vehicle unlock rules;

identifying a second rule in a second set of vehicle unlock rules by the vehicle entry control unit based on the first context;

selectin, based on a comparison of the first rule and the second rule, a more restrictive first applicable rule associated with the first context;

in response to determining the first context of the vehicle, determining by the vehicle entry control unit within a pre-defined time interval after the first time that a plurality of door handles of the vehicle are being actuated; and based on receiving the first wireless remote unlock signal, based on determining that a plurality of door handles of the vehicle are being actuated, and based on the more restrictive first applicable rule, commanding electro-mechanical unlock of the vehicle by the vehicle entry control unit.

16. The method of claim 15, wherein the vehicle is one of a passenger car, a pick-up truck, a sport utility vehicle (SUV), a mini-van, a van, a moving van, or a delivery truck.

17. The method of claim 15, further comprising:

sensing a number of occupants in the vehicle at a second time, where the second time is prior to the first time;

storing the number of occupants in the vehicle by the vehicle entry control unit prior to the first time; and comparing the stored number of occupants in the vehicle to a number of the door handles that are being actuated by the vehicle entry control unit.

18. The method of claim 15, wherein determining the first context comprises comparing a location of the vehicle entry control unit to a definition of a high security risk area and determining that the vehicle entry control unit is located within the high security risk area.

19. The method of claim 18, wherein the vehicle entry control unit stores a definition of a plurality of high security risk areas, wherein each high security risk area is delimited by a zip-code value or by a geohash value.

20. The method of claim 15, further comprising:

sensing a number of occupants in the vehicle at a third time, wherein the number of occupants of the vehicle is greater than one;

storing the number of occupants in the vehicle by the vehicle entry control unit;

receiving a second wireless remote unlock signal at a fourth time by the vehicle entry control unit, wherein the fourth time is after the third time;

determining a second context of the vehicle by the vehicle entry control unit after the fourth time, wherein the second context is a high security risk context;

in response to determining the second context of the vehicle, determining by the vehicle entry control unit within a pre-defined time interval after the fourth time that a single door handle of the vehicle is being actuated;

comparing the stored number of occupants in the vehicle to the single door handle that is being actuated by the vehicle entry control unit; and based on receiving the second wireless remote unlock signal and based on determining that a single door handle of the vehicle is being actuated is less than the stored number of occupants, interdicting electro-mechanical unlock of the vehicle by the vehicle entry control unit.

* * * * *